(12) United States Patent
Adel (10) Patent No.: US 10,634,386 B2
(45) Date of Patent: Apr. 28, 2020

(54) HOLDING DEVICE

(71) Applicant: Ahmed Adel, Vienna (AT)

(72) Inventor: Ahmed Adel, Vienna (AT)

(73) Assignee: Ahmed Adel, Vienna (AT)

( * ) Notice: Subject to any disclaimer, the term of this patent is extended or adjusted under 35 U.S.C. 154(b) by 813 days.

(21) Appl. No.: 14/408,407

(22) PCT Filed: Aug. 29, 2013

(86) PCT No.: PCT/EP2013/067879
§ 371 (c)(1),
(2) Date: Dec. 6, 2016

(87) PCT Pub. No.: WO2014/037272
PCT Pub. Date: Mar. 13, 2014

(65) Prior Publication Data
US 2017/0138637 A1    May 18, 2017

(30) Foreign Application Priority Data

Sep. 10, 2012 (AT) .................... 985/2012

(51) Int. Cl.
*F24S 30/428* (2018.01)
*F24S 23/74* (2018.01)
(Continued)

(52) U.S. Cl.
CPC ........... *F24S 30/428* (2018.05); *F24S 23/745* (2018.05); *F24S 25/50* (2018.05); *H02S 40/22* (2014.12);
(Continued)

(58) Field of Classification Search
CPC .......... F24S 23/745; F24S 25/50; F24S 25/70; F24S 30/428; H02S 40/22; G02B 19/0042; Y02E 10/47; Y02E 10/52
See application file for complete search history.

(56) References Cited

U.S. PATENT DOCUMENTS 297,479 A * 4/1884 Wegner .................. E01D 11/02
                                                       14/19
470,992 A * 3/1892 Day ........................ B61B 7/02
                                                       104/117
(Continued)

FOREIGN PATENT DOCUMENTS

| CA | 662032 A | 4/1963 |
| KR | 101004108 B1 | 12/2010 |
| WO | 2011/059062 A1 | 5/2011 |

OTHER PUBLICATIONS

How Suspension Bridges Work by HowStuffWorks Inc, attached as "HowStuffWorks_inc_suspension bridge 2003.pdf" (Year: 2003).*
(Continued)

*Primary Examiner* — Avinash A Savini
*Assistant Examiner* — Martha M Becton
(74) *Attorney, Agent, or Firm* — Jordan IP Law, LLC; Todd A. Vaughn (57) ABSTRACT

A device for holding a material and a method for holding such materials. The device includes a lower part having at least two engagement points, at least one elongated flexible tensioning element that is attached suspended between the engagement points, and traction mechanisms that are attached on the tensioning element or are part of the tensioning element. The tensioning element is connected to, encloses or carries the material, and the device is configured such that all traction mechanisms can be pulled simultaneously with identical or different tensile force in the direction of the lower part.

20 Claims, 8 Drawing Sheets

(51) Int. Cl.
  *F24S 25/50* (2018.01)
  *H02S 40/22* (2014.01)
  *G02B 19/00* (2006.01)

(52) U.S. Cl.
  CPC .......... *G02B 19/0042* (2013.01); *Y02E 10/47* (2013.01); *Y02E 10/52* (2013.01)

(56) References Cited

U.S. PATENT DOCUMENTS

| | | | | |
|---|---|---|---|---|
| 495,621 A * | 4/1893 | Balet | E01D 11/04 | 14/8 |
| 509,392 A * | 11/1893 | Paine | F24S 23/74 | 126/607 |
| 510,064 A * | 12/1893 | Eddy | E01D 11/02 | 14/19 |
| 513,389 A * | 1/1894 | Greer | E01D 11/00 | 14/20 |
| 582,079 A * | 5/1897 | McClintic | B66C 23/70 | 212/177 |
| 588,177 A * | 8/1897 | Reagan, Jr. | H01L 35/00 | 136/206 |
| 665,317 A * | 1/1901 | Fisher | E01D 15/127 | 14/11 |
| 670,916 A * | 3/1901 | Eneas | F24S 23/75 | 126/600 |
| 670,917 A * | 3/1901 | Eneas | F24S 23/75 | 126/603 |
| 951,874 A * | 3/1910 | Wood | B65G 35/00 | 104/123 |
| 997,725 A * | 7/1911 | Wilson | E04H 17/08 | 24/683 |
| 1,157,781 A * | 10/1915 | Howard | E04H 12/20 | 135/118 |
| 1,253,809 A * | 1/1918 | Gelner | E01D 11/02 | 14/18 |
| 1,481,019 A * | 1/1924 | Luebbert | E04H 15/18 | 135/87 |
| 1,558,528 A * | 10/1925 | Wrenn | B60M 1/23 | 191/41 |
| 1,592,685 A * | 7/1926 | Schachenmeier | E01D 11/02 | 14/19 |
| 1,674,279 A * | 6/1928 | Ebeling | E01D 15/124 | 14/2.4 |
| 1,785,023 A * | 12/1930 | Edwards | E01D 19/14 | 14/23 |
| 1,825,800 A * | 10/1931 | Houseman | E04B 7/14 | 52/81.2 |
| 1,828,349 A * | 10/1931 | Williams | E01F 15/06 | 256/13.1 |
| 1,897,470 A * | 2/1933 | Forssell | E01D 19/16 | 14/22 |
| 2,016,191 A * | 10/1935 | Cordova | E01D 19/16 | 14/18 |
| 2,128,030 A * | 8/1938 | Koleno | E04H 17/04 | 256/39 |
| 2,367,291 A * | 1/1945 | Le Tourneau | E01D 15/133 | 14/2.4 |
| 2,413,019 A * | 12/1946 | Wolfard | E01D 11/00 | 14/19 |
| 2,534,710 A * | 12/1950 | Golian | H01Q 15/20 | 135/22 |
| 2,622,546 A * | 12/1952 | Kramrisch | E04B 7/14 | 135/908 |
| 2,642,598 A * | 6/1953 | Beretta | E01D 6/00 | 14/18 |
| 2,661,488 A * | 12/1953 | Kenan | E01D 18/00 | 137/236.1 |
| 2,693,195 A * | 11/1954 | Frieder | E04B 1/34326 | 135/122 |
| 2,706,023 A * | 4/1955 | Merritt | E04H 12/20 | 248/230.9 |
| 2,736,398 A * | 2/1956 | Peterson | E04H 12/20 | 174/45 R |
| 2,878,498 A * | 3/1959 | Gollnow | E01D 11/00 | 14/19 |
| 2,906,257 A * | 9/1959 | Abbot | F24S 10/45 | 126/607 |
| 2,914,783 A * | 12/1959 | Hoyden | E01D 19/14 | 14/21 |
| 2,999,340 A * | 9/1961 | Maculan | E04D 12/00 | 52/231 |
| 3,055,484 A * | 9/1962 | Hubert | B65G 21/02 | 14/18 |
| 3,063,521 A * | 11/1962 | Fuller | E04B 1/19 | 428/542.2 |
| 3,132,363 A * | 5/1964 | Roberts | E01D 11/02 | 14/18 |
| 3,174,397 A * | 3/1965 | Sanborn | G02B 26/0825 | 359/853 |
| 3,211,163 A | 10/1965 | Gugliotta | | |
| 3,255,591 A * | 6/1966 | Thornley | E01D 19/14 | 405/224 |
| 3,288,158 A * | 11/1966 | Gugliotta | E04B 7/163 | 135/120.2 |
| 3,367,661 A * | 2/1968 | Dean, Jr. | A63B 24/0021 | 273/374 |
| 3,406,404 A * | 10/1968 | Maier | H01Q 15/161 | 126/624 |
| 3,496,687 A * | 2/1970 | Greenberg | B64G 9/00 | 294/86.4 |
| 3,553,701 A * | 1/1971 | Thomas | H01Q 1/1242 | 343/766 |
| 3,558,219 A * | 1/1971 | Buckingham et al. | B64G 9/00 | 359/851 |
| 3,601,944 A * | 8/1971 | Shepherd | E04B 7/14 | 52/571 |
| 3,635,547 A * | 1/1972 | Rushing | G02B 5/08 | 343/915 |
| 3,673,624 A * | 7/1972 | Finsterwalder | E01D 11/02 | 14/19 |
| 3,707,720 A * | 12/1972 | Staehlin | H01Q 15/161 | 343/755 |
| 3,725,946 A * | 4/1973 | Quequen | H01Q 15/161 | 343/912 |
| 3,758,905 A * | 9/1973 | Baratta | E01D 11/00 | 14/19 |
| 3,781,095 A * | 12/1973 | Rushing | G02B 7/182 | 359/847 |
| 3,810,481 A * | 5/1974 | Nohmura | E04H 15/04 | 135/158 |
| 3,843,238 A * | 10/1974 | Rushing | F24S 23/81 | 359/847 |
| 3,857,130 A * | 12/1974 | Sofronie | E01D 11/02 | 14/19 |
| 3,864,776 A * | 2/1975 | Hedefine | E01D 11/02 | 14/21 |
| 3,872,854 A * | 3/1975 | Raser | F24S 30/40 | 126/606 |
| 3,965,625 A * | 6/1976 | White | B66B 9/16 | 52/29 |
| 4,000,734 A * | 1/1977 | Matlock | F24S 23/74 | 126/576 |
| 4,025,786 A * | 5/1977 | Hamilton | H01L 31/042 | 250/214.1 |
| 4,062,081 A * | 12/1977 | Ramer | E01D 15/127 | 14/2.4 |
| 4,069,765 A * | 1/1978 | Muller | E01B 25/16 | 104/112 |
| 4,078,549 A * | 3/1978 | McKeen | G01S 3/7861 | 126/606 |
| 4,108,154 A * | 8/1978 | Nelson | G01S 3/7861 | 126/576 |
| 4,135,493 A * | 1/1979 | Kennedy | G01S 3/7861 | 126/577 |
| 4,161,942 A * | 7/1979 | Monk | F24S 40/20 | 126/576 |

(56) References Cited

U.S. PATENT DOCUMENTS

| | | | | |
|---|---|---|---|---|
| 4,173,397 A | * | 11/1979 | Simpson | F24S 20/20 359/849 |
| 4,208,969 A | * | 6/1980 | Baltensperger | E01B 25/24 104/111 |
| 4,211,211 A | * | 7/1980 | Toomey | F24S 23/80 126/652 |
| 4,223,495 A | * | 9/1980 | Peter | E01D 6/00 14/22 |
| 4,240,406 A | * | 12/1980 | Hutchison | F24S 23/745 359/867 |
| 4,245,895 A | * | 1/1981 | Wildenrotter | H02S 20/30 359/848 |
| 4,251,135 A | * | 2/1981 | Stone | F24S 23/81 359/847 |
| 4,263,893 A | * | 4/1981 | Pavlak | F24S 20/50 126/627 |
| 4,281,900 A | * | 8/1981 | Lewis, Jr. | G02B 7/183 359/853 |
| 4,291,677 A | * | 9/1981 | Monk | G01S 3/7861 126/606 |
| 4,297,003 A | * | 10/1981 | Hutchison | F24S 23/74 359/852 |
| 4,313,422 A | * | 2/1982 | McEntee | F24S 23/745 126/624 |
| 4,340,031 A | * | 7/1982 | Niedermeyer | G02B 5/10 126/600 |
| 4,365,616 A | * | 12/1982 | Vandenberg | F24S 23/80 126/581 |
| 4,416,263 A | * | 11/1983 | Niedermeyer | G02B 5/10 126/694 |
| 4,422,614 A | * | 12/1983 | Santos | F24S 30/425 248/475.1 |
| 4,423,719 A | * | 1/1984 | Hutchison | F24S 23/74 126/694 |
| 4,424,802 A | * | 1/1984 | Winders | F24S 30/425 126/575 |
| 4,457,035 A | * | 7/1984 | Habegger | E01D 15/122 14/18 |
| 4,464,803 A | * | 8/1984 | Bonasso | E04C 3/22 14/20 |
| 4,466,423 A | * | 8/1984 | Dolan | F24S 30/48 126/571 |
| 4,532,916 A | * | 8/1985 | Aharon | F24S 23/77 126/600 |
| 4,552,438 A | * | 11/1985 | Murphy | G02B 7/183 359/847 |
| 4,608,964 A | * | 9/1986 | Russo | F24S 23/715 126/688 |
| 4,611,575 A | * | 9/1986 | Powell | F24S 23/745 126/605 |
| 4,832,001 A | * | 5/1989 | Baer | H02S 20/30 126/579 |
| 4,875,467 A | * | 10/1989 | Murphy | F24S 30/452 126/600 |
| 5,191,876 A | * | 3/1993 | Atchley | G01S 3/786 126/576 |
| 5,208,932 A | * | 5/1993 | Muller | E01D 11/04 14/21 |
| 5,325,844 A | * | 7/1994 | Rogers | F24S 30/458 126/605 |
| 5,347,986 A | * | 9/1994 | Cordy | F22B 1/006 126/574 |
| 5,493,746 A | * | 2/1996 | Minakami | E01D 11/02 14/18 |
| 5,513,408 A | * | 5/1996 | Minakami | E01D 11/02 14/18 |
| 5,640,950 A | * | 6/1997 | Cordy, Jr. | F24S 20/20 126/577 |
| 5,784,739 A | * | 7/1998 | Kawada | E01D 11/02 14/18 |
| 5,787,671 A | * | 8/1998 | Meguro | B64G 1/222 52/646 |
| 5,864,324 A | * | 1/1999 | Acker | H01Q 15/161 343/912 |
| 5,865,905 A | * | 2/1999 | Clemens | H01L 31/0547 126/624 |
| 6,728,987 B1 | * | 5/2004 | Hinman | E01D 11/00 14/22 |
| 7,285,719 B2 | * | 10/2007 | Conger | F24S 25/50 136/245 |
| 7,415,746 B2 | * | 8/2008 | Tao | E01D 21/00 14/77.1 |
| D605,585 S | * | 12/2009 | Conger | F24S 25/50 D13/102 |
| 7,687,706 B2 | * | 3/2010 | Conger | F24S 25/50 136/245 |
| 7,748,376 B2 | * | 7/2010 | Bender | G02B 26/0816 126/696 |
| D631,004 S | * | 1/2011 | Johnson | D13/102 |
| D649,112 S | * | 11/2011 | Conger | F24S 25/50 D13/102 |
| 8,056,555 B2 | * | 11/2011 | Prueitt | F24S 23/71 126/696 |
| D655,672 S | * | 3/2012 | Conger | F24S 25/50 D13/102 |
| 8,186,342 B2 | * | 5/2012 | Gonzalez Gonzalez | F24S 70/16 126/689 |
| 8,381,464 B2 | * | 2/2013 | Conger | F24S 25/50 52/173.3 |
| 8,408,198 B2 | * | 4/2013 | Bender | G02B 26/0816 126/600 |
| 8,429,861 B2 | * | 4/2013 | Conger | F24S 25/50 52/146 |
| 8,448,390 B1 | * | 5/2013 | Clemens | F24S 25/50 52/173.3 |
| 8,519,257 B2 | * | 8/2013 | Conger | H02S 20/10 136/245 |
| 8,627,530 B2 | * | 1/2014 | Byun | E01D 21/00 14/18 |
| 8,931,222 B2 | * | 1/2015 | Alberto | F24S 25/617 52/223.13 |
| 9,091,462 B2 | * | 7/2015 | Ratti | F22B 1/006 |
| 9,564,851 B2 | * | 2/2017 | Conger | H02S 20/10 |
| 9,954,478 B2 | * | 4/2018 | Conger | H02S 20/10 |
| D850,362 S | * | 6/2019 | Bodurow | D13/102 |
| 2010/0051018 A1 | * | 3/2010 | Ammar | F24S 23/82 126/634 |
| 2011/0073104 A1 | * | 3/2011 | Dopp | F24S 25/00 126/651 |

OTHER PUBLICATIONS

Pre-Calculus Quadratics attached as "precalculus_quadratics_sep_2010" (Year: 2010).*

Dissertation paper, "Development of a New Generation of Parabolic Trough Collectors to Maximize the Local Content in Developing Countries—From Idea to Business," author DI Ahmed Adel; Technische Universitat Wien, Oct. 2018 attached as "Dev_of_a_new_gen_of_parabalic_reflectors_ADEL_paper_2018.pdf" (Year: 2018).*

* cited by examiner

HOLDING DEVICE

CROSS-REFERENCE TO RELATED APPLICATIONS

The present application is a National Stage application of PCT International Application No. PCT/EP2013/067879 (filed on Aug. 29, 2013), under 35 U.S.C. § 371, which claims priority to Austrian Patent Application No. A985/2012 (filed on Sep. 10, 2012), which are each hereby incorporated by reference in their respective entireties.

TECHNICAL FIELD

The invention relates to a device for holding a material, for example, for holding a reflector of a parabolic mirror or a parabolic trough collector, and to a method for holding such materials.

BACKGROUND

Parabolic trough collectors are parabolically formed solar troughs which concentrate the direct solar radiation onto a so-called focal line in which an absorber tube or a photovoltaic module is attached. The higher the concentration onto the focal point, the better is the energy yield and the efficiency of the device. High concentration can be achieved by parabolic collectors which have a large aperture and high optical precision. Realizing large apertures can further reduce costs by reducing component count per unit energy.

However, when increasing the aperture of a parabolic trough collector, the problem of increased wind loads occurs, which effects that the parabolic mirror moves or swings and that focus deviations occur. For this reason, the aperture in most of the known parabolic trough collectors is limited to a value of 7.51 m, and a complex holding construction is required in order to avoid focus deviations due to wind loads and to achieve optical precision. The holding construction is the main cost driver of such parabolic trough collectors. Currently, considerable efforts are made in order to get a grip on the problem of wind loads on parabolic trough collectors by suitably formed holding devices. Furthermore, it is difficult with the available constructions to generate on site a precise parabolic shape. Costs have been reduced over the last decade by increasing system size, i.e. utilizing larger mirror structures in both width and length, as well as by implementing new and innovative designs. However, further improvements in parabolic troughs have proved difficult, as the industry attempts to achieve high optical precision while minimizing both material and cost in the support structure.

Moreover, in the case of the conventional constructions, any damage thereto results in the fact that possibly the entire collector, namely reflecting components and the holding construction are damaged and have to be replaced.

Finally, shipping of conventional concentrators is expensive and complicated due to the weight and the dimensions of the holding construction and the reflective materials.

The known versions of the parabolic troughs have either an almost exact parabolic shape, but inflexible parameters (parameters are to be understood here as the aperture and the focal length), or slightly flexible parameters, but no exact parabolic shape (e.g. inflatable concentrators). On the other hand, concentrators having slightly flexible parameters (e.g. inflatable concentrators) are usually not robust enough to withstand the adverse weather conditions and do not always withstand the required stress.

An example of such devices from the prior art can be found in US 2010314509 A1 and in WO 2011059062 A1. However, neither ensuring the optical precision or the adjustability of the parameters matters in the two inventions since they do not relate to solar concentrators.

SUMMARY

It is an object of the invention, on the one hand, to provide a device for holding a parabolic mirror which prevents focus deviations due to wind loads, whereby significantly larger apertures can be achieved at the same time. On the other hand, material requirements, production costs, maintenance costs and shipping costs are to be kept as low as possible in order to keep costs low for the electricity generated with the device. Furthermore, it is an object to provide a device which enables to set and adjust the aperture and the focal length of the collector on site.

This is achieved according to the invention by the features set forth in the claims.

In accordance with the invention, the device comprises a lower part having at least two engagement points, at least one flexible tensioning element that is attached suspended between the engagement points, traction means that are attached to the tensioning element or are a part of the tensioning element, wherein the tensioning element is connected to, encloses or carries the material to be held, and is configured in such a manner that all traction means can be pulled simultaneously with identical or different tensile force in the direction of the lower part.

As a result, a particular shape of the tensioning element and therefore of the material to be held is achieved in a simple manner. For example, and particularly advantageous, a parabolic shape can be achieved in a very simple manner if the distances between the traction means and the tensile forces applied to the traction means are identical. In this case, the parabolic shape is achieved by means of the tensile forces without the need of expensive constructional measures.

The expected deviation from the exact parabolic shape when wind loads occur is a direct function of the pretensioning in the tensioning element. Therefore, the deviation from the ideal shape occurring under load can be reduced by higher pretensioning in the tensioning element. Thus, the pretensioning that leads to the maximum permissible deviation from the ideal shape is defined when designing the device.

In contrast to the conventional collectors, the traction means carry the material along the entire length thereof, and the occurring wind loads are deflected in the form of axial forces to the lower part, and do not impact the material to be held, such as the reflector, for example. As a result, bending deformations of the reflector and focus deviations are prevented, wherein material requirement are reduced at the same time, and assembly and maintenance costs are reduced as well. Without bending deformation, the displacements at the end of the support arm are significantly reduced and, as a result, significantly larger apertures can be achieved for comparable permissible total deformations.

The specific embodiment shown below with adjustable focal length and adjustable aperture makes the device in accordance with the invention particularly suitable for research purposes.

The invention is not limited to parabolic mirrors; it is also provided to achieve a different shape of the material to be held by means of a different arrangement of the traction means or a different distribution of the tensile forces.

The mathematical proof for forming the parabolic shape of the tensioning element and therefore of the material to be spanned is illustrated below based on FIG. 1.

Figure 1:
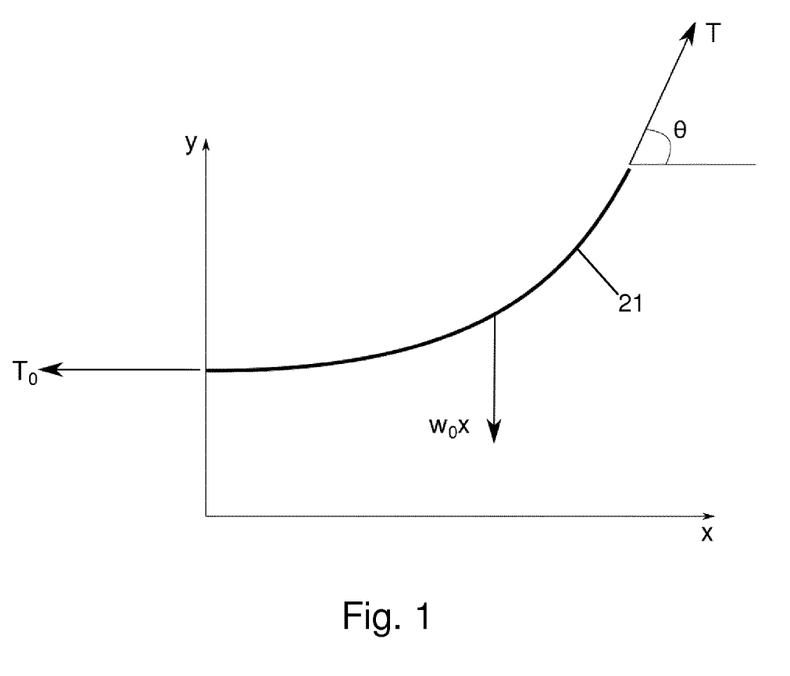
FIG. 1 shows a schematic illustration that explains the operating principle.

FIG. 1 shows a portion of the tensioning element in the clamped state with the forces acting thereon. The symbol w0 designates the downwardly acting and uniformly distributed force for per unit length, and w0x designates the downwardly acting force applied to this portion of the tensioning element.

The symbol T0 designates the tangentially and horizontally acting force applied to the lowest point of the tensioning element, and T designates the tangentially acting force.

The tensioning element is assumed to be static so that the sum of the horizontal and vertical forces must be zero. This results in the equations T·sin θ=w0x and T·cos θ=T0. This leads to:

$$\tan(\theta) = \frac{w_0 x}{T_0}$$

$$\frac{dy}{dx} = \frac{w_0}{T_0} x = ax$$

wherein $$y = \frac{ax^2}{2} + C$$

Thus, the curve y(x) formed by the tensioning element is a parabola.

An advantage of the invention is that the sum of the tensile forces exerted on the tensioning element is normally higher than the wind loads exerted on the spanned flexible material. As a result of this, the wind loads are negligible and do not result in a bending or deformation of the material.

Moreover, in the device in accordance with the invention, all wind loads are diverted to the engagement points via the tensioning element and the traction means. When using support arms on which the engagement points are arranged and with appropriate shaping of the support arms, for example by forming an obtuse angle, wherein the support arms preferably follow the shape of the tensioning element, it can be achieved that the wind forces are deflected in the form of axial forces to the support arms. As a result, no bending or deforming of the material takes place.

Another advantage of the invention is that the material to be held can be held at significantly more points than this is usually the case. As a result, more favorable mirror segments can be used without the need to use mirrors with very good bending properties. In the case of rigid constructions, the parabolic mirror is mostly fastened to the substructure only at four to six points so that these fastening points are heavily stressed under wind load. Within the context of the present invention, considerably more connecting points between the tension means and the tensioning element can be provided, resulting in higher stability.

Also, the material to be held can easily be detached from the substructure since for this purpose, only the tensile forces have to be removed and the traction means have to be loosened. This permits a simple and fast dismantling of the device. The flexible design also enables to carry out all possible adjustments in the operation and maintenance phase with just a few steps.

The use of flexible materials as provided in accordance with the invention permits simple shipment of these materials in the form of compact packets, wherein the materials can be placed on site onto the lower part and can be tightened.

Also, the materials can already be fastened to the tensioning elements and the traction means in the factory so that the parabolic shape is obtained on site simply by applying the tensile forces.

In accordance with the invention it is provided that the lengths of the traction means for achieving the necessary optical precision can be adjusted during assembly or in the operation and maintenance phase. This serves for the purpose that in the case of inaccurate machining during the production (if the traction means are too short or too long, for example), it is nevertheless possible on site to obtain an exact parabolic shape by fine adjustment of the lengths of the traction means.

One of the most significant advantages of the invention is that through the device in accordance with the invention any desired shape of the material to be held can be set up and can be changed within the shortest time. In the case of a parabolic shape, for example, the aperture can be adjusted by shifting the engagement points, and the focal length can be adjusted by shortening or lengthening the tensioning element. However, the invention is not limited to a parabolic shape.

In accordance with the invention it can be provided that the lower part comprises at least two support arms, the ends of which form or comprise the engagement points. As a result, wind loads are deflected to axial forces in the support arms, which can be transmitted more easily to the substructure.

Uprights, in particular pylons, the ends of which form or comprise the engagement points, can be arranged on the lower part or also on the support arms. It is not absolutely necessary for the pylons to be arranged vertical; they can also be arranged at an angle, for example V-shaped.

The tensioning element can be a cable, a wire, a rope, a chain or a flexible sheet metal or can be formed by such an element. For adjusting the optical precision of the device, the traction means can be adjustable with respect to their length. The traction means can be implemented, for example, in the form of rods, ropes, chains or springs, in particular elastic springs, or can comprise them.

It is also provided in accordance with the invention that one or more tensioning elements are attached to the traction means simply in the form of a screw, a turnbuckle, an adhesive or a weld. The traction means can also be part of the tensioning element.

The material to be held can comprise flexible material and/or can be configured in the form of a plurality material segments which are separated from one another or are pivotably connected to one another. The material and/or the material segments can comprise reflective material, in particular one or more mirror segments or reflector segments.

Rigid material, for example a glass mirror, can also be provided as a material to be held. In this case, the exact parabolic shape of the tensioning element is essential so that the glass mirror can be held in a stress-free manner.

The traction means can be arranged in a substantially vertical position. The horizontal distances of the traction means between one another can be substantially identical, and the tensile force acting on each traction means can be substantially identical. Through this it is achieved that the tensioning element assumes a parabolic shape.

At least one joist can be provided, wherein each traction means is connected to the joist. Within the scope of this invention, the term joist comprises any element that can be used to attach the traction means, and is not limited to any specific realization as a support structure, girder, beam, carrier, pillar, or porter. Particularly, the joist can be arranged horizontally, vertically, or in any angle with regard to the support structure.

The tensioning element can be connected to the joist at least at one point via a screw, a turnbuckle, a weld or an adhesive layer.

The joist can preferably be movable so that each traction means can be acted on by the joist with a tensile force. The joist can be guided with respect to the lower part in such a manner that during a movement of the joist in the direction of the lower part, a tensile force is exerted on the traction means, which tensile force is identical for each traction means.

A plurality of joists can be provided, which can be interconnected via a connecting element, in particular a longitudinal strut, and which can be jointly set in motion.

This makes it possible to create a trough structure, in particular a trough collector, that has a plurality of tensioning elements which extend parallel and which are tensioned via joists that are arranged parallel, wherein all joists are jointly set in motion with one longitudinal strut.

As an alternative it is provided in accordance with the invention that the joists can be pulled individually with a tensioning device in the direction of the lower part without using a longitudinal strut.

The joists can also be configured to be rigid, wherein the tensile forces are exerted on the traction means by adjusting the lengths of the tensioning elements, for example by means of turnbuckles, or by adjusting the lengths of the traction means.

The traction means can be formed by sections of an elongated bendable traction rope, wherein deflection points, in particular deflection rollers for movably mounting the traction rope are provided on the tensioning element and on the joist, and the traction rope is alternately guided by the deflection points on the tensioning element and the joist. The horizontal projections of the distances between the deflection points along the tensioning elements are substantially identical.

The device can preferably be implemented as a parabolic mirror, parabolic reflector or parabolic trough collector.

The device can be equipped with a tracking system so as to follow the movement of the sun.

The distance of the engagement points from one another can be adjustable, for example in that the engagement points are attached on support arms and the support arms are displaceable symmetrically relative to the lower part. Furthermore, the length of the traction means between the engagement points can be adjustable. The tensioning element can also be configured as circumferentially extending element, in particular as a circumferentially extending rope.

The invention further comprises methods for holding a material, for setting the aperture and for setting the focal length as well as for adjusting a device in accordance with the invention.

The method in accordance with the invention for holding material comprises the following methods steps.

First, an elongated flexible tensioning element, which is connected to, encloses or carries the material to be held, is attached between at least two engagement points of a lower part.

Thereafter, the traction means attached to the tensioning element are pulled with identical or different tensile force in the direction of the lower part in such a manner that the tensioning element adopts a predetermined shape, for example a parabolic shape.

When the material to be held comprises a flexible material and/or is configured in the form of a plurality of material segments that are separated from one another or are pivotably connected to one another, an aperture and/or a focal length of the material can be adapted. For setting an aperture of the material, the engagement points can be displaced symmetrically to the lower part, for example in the horizontal direction. For setting a focal length of the material, the length of the tensioning element between the engagement points can be increased or decreased.

It is provided in accordance with the invention that for adjusting the device, the lengths of the traction means are adjusted, even if the material is not flexible, but rather rigid. This makes it possible in the case of machining inaccuracies during the production, for example, if the traction means are too short or too long, that a perfect, for example, parabolic shape can nevertheless be achieved during assembly.

Further advantageous configurations arise from the claims, the description and the figures.

DRAWINGS

The invention is now explained in greater detail by means of exemplary embodiments in the following drawings.

DESCRIPTION

For reasons of simplification, a required absorber tube or a photovoltaic module is not illustrated in any of the schematic drawings.

FIG. 1 shows a portion of the tensioning element 21 in the clamped state with the forces acting thereon.

Figure 2A:
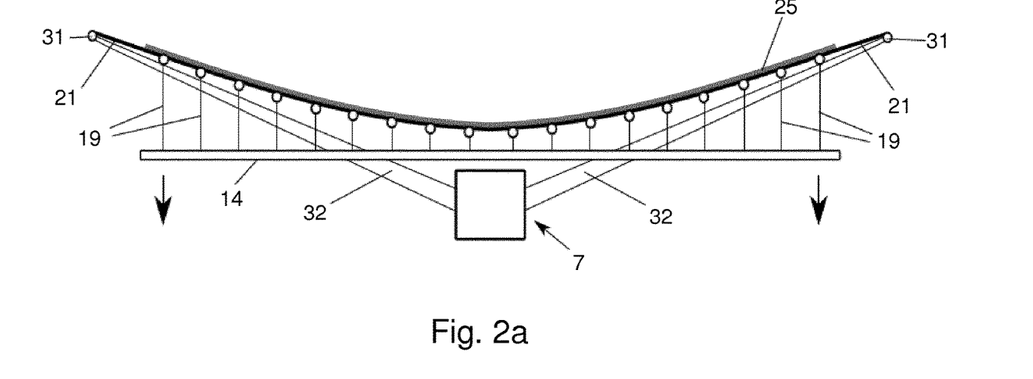
FIGS. 2a-2g shows different embodiments of the device in accordance with the invention.

FIG. 2a shows a first embodiment of the invention. A lower part 7 has support arms 32 which are arranged at an obtuse angle with respect to one another and the cross-section of which decreases from the lower part 7 towards their ends. Engagement points 31 are provided on the tips of the support arms. The engagement points can be fastening points or rollers. A rope 21 is spanned between the engagement points.

The rope 21 carries a reflector 25, for example in the form of mirror segments that are movably connected to one another or are not connected. Traction means 19 are attached on the rope 21 and are fastened at their other ends to a joist 14. The traction means 19 are attached at identical horizontal distances from one another. When the joist 14 is pulled downwards, as indicated by the arrows, identical forces are exerted on each of the traction means, and the tensioning element adopts a parabolic shape.

Figure 2B:
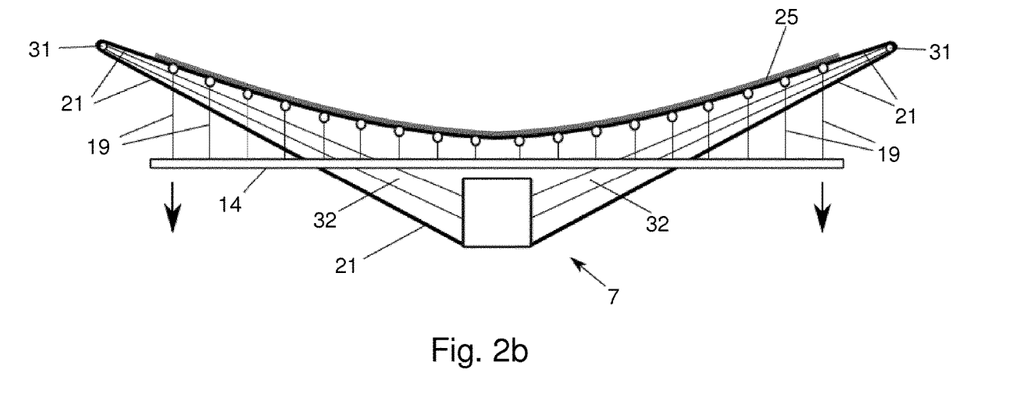

FIG. 2b shows a second exemplary embodiment of the device in accordance with the invention. In this case, the engagement points 31 are not used for fixation, but for deflecting the rope 21. The rope 21 is configured as a circumferentially extending rope and runs around the support arms.

Figure 2C:
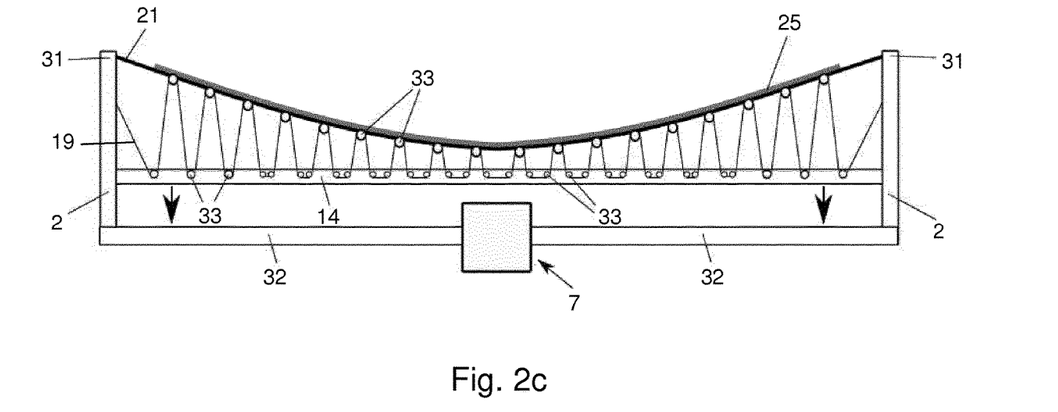

FIG. 2c shows another exemplary embodiment of the invention. In this case, the traction means are formed by sections of an elongated bendable traction rope, wherein deflection rollers 33 for movably mounting the traction rope are provided at the rope 21 and on the joist 14, and the traction rope is guided alternately through the deflection points on the tensioning element and on the joist.

Figure 2D:
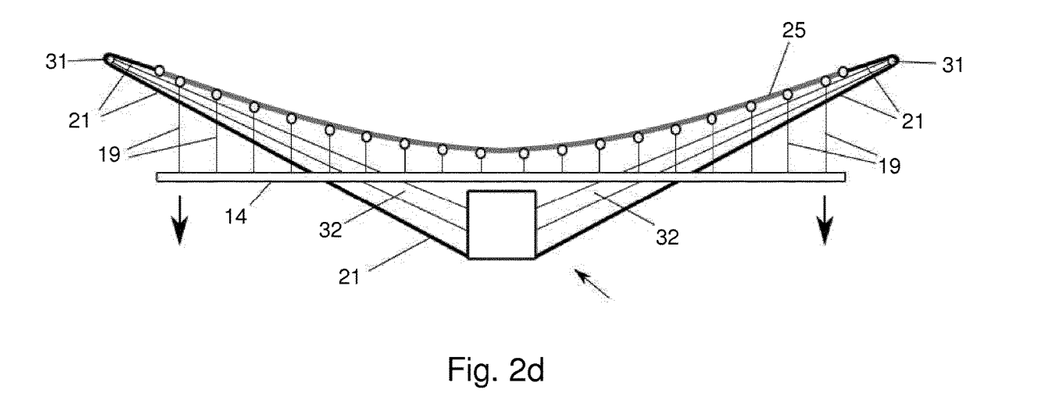

FIG. 2d shows another exemplary embodiment of the invention. The exemplary embodiment corresponds to that of FIG. 2b; however, in this case, the reflector 25 is connected at its end to the rope 21. The traction means 19 engage directly on the reflector 25 and not on the rope 21.

Figure 2E:
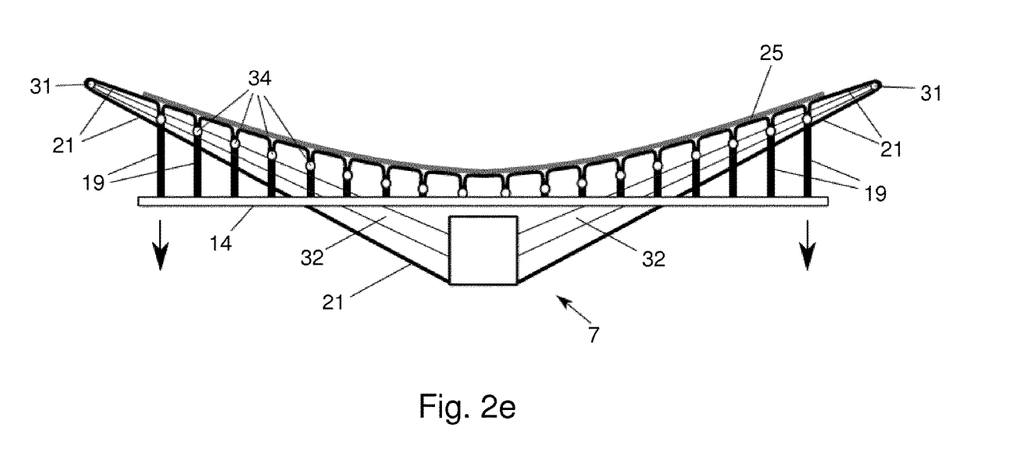

FIG. 2e shows another exemplary embodiment of the invention. The exemplary embodiment corresponds to that of FIG. 2b; however, in this case, there are no separate traction means, but the rope 21 is clamped together at predetermined positions by clamps 34, welds or the like and is directly connected to the joist 14 at the part clamped in this manner. As a result, the rope itself acts as a traction means and no separate traction means are necessary. By the movement of the joist 14, a tensile force in the meaning of the invention is exerted on the clamped parts of the rope 21 without the need of separate traction means.

Figure 2F:
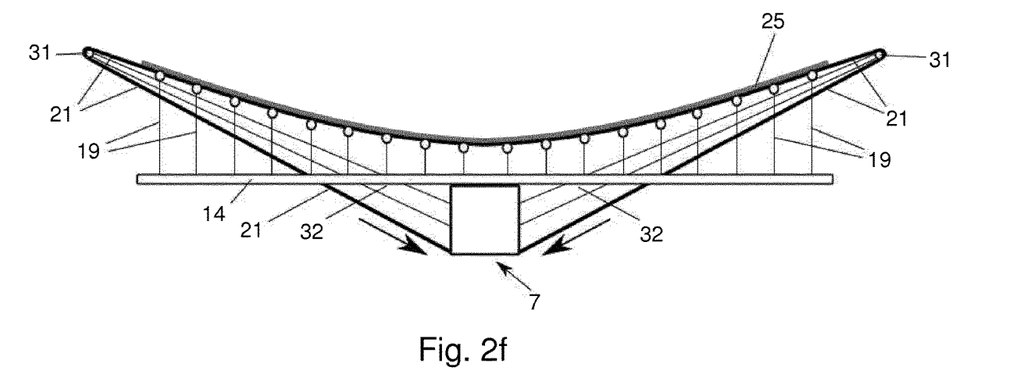

FIG. 2f shows another exemplary embodiment of the invention. The exemplary embodiment corresponds to that of FIG. 2b; however, in this case, the joist 14 is rigidly fastened to the lower part 7. The rope 21 is circumferentially attached and carries the reflector 25. For exerting a tensioning force on the rope 21 (indicated by the arrows) tensioning devices (not illustrated), for example turnbuckles, are arranged on the rope 21. As a result, a shape of the rope 21 predetermined by the traction means 19 can be achieved in a simple manner without the need that the supporting structure itself has to be adjustable.

Figure 2G:
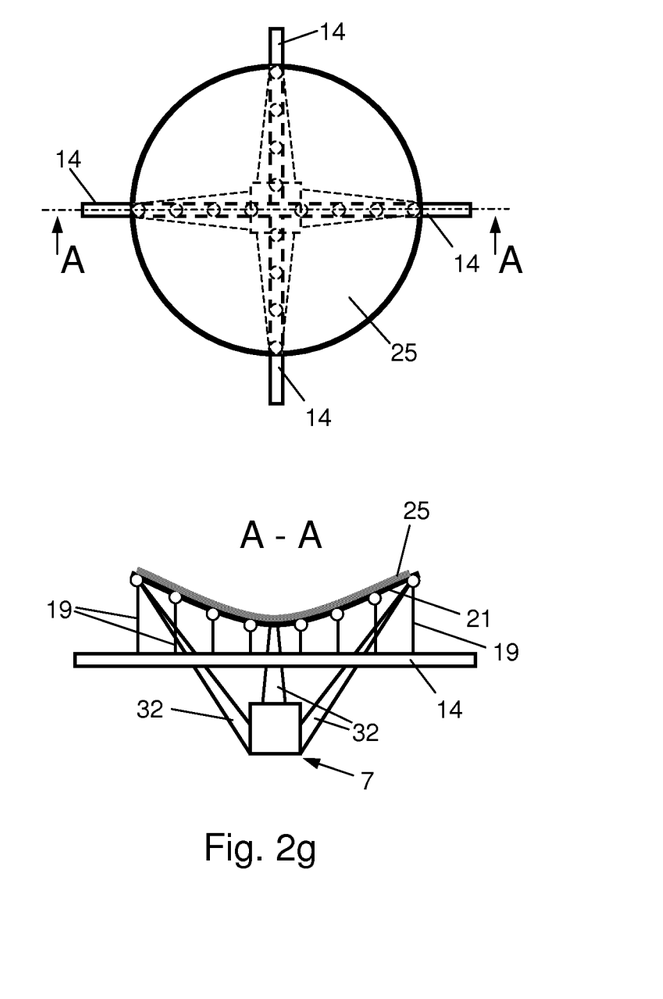

FIG. 2g shows another exemplary embodiment of the invention. A lower part 7 having four support arms 32 arranged perpendicular to one another is provided. The support arms 32 carry two ropes 21 that are tensioned via two joists 14 that are aligned to be perpendicular to one another. As a result, a substantially parabolic shape is obtained for the spanned reflector 25. The parabolic shape can be further improved by using additional support arms or joists.

Figure 3:
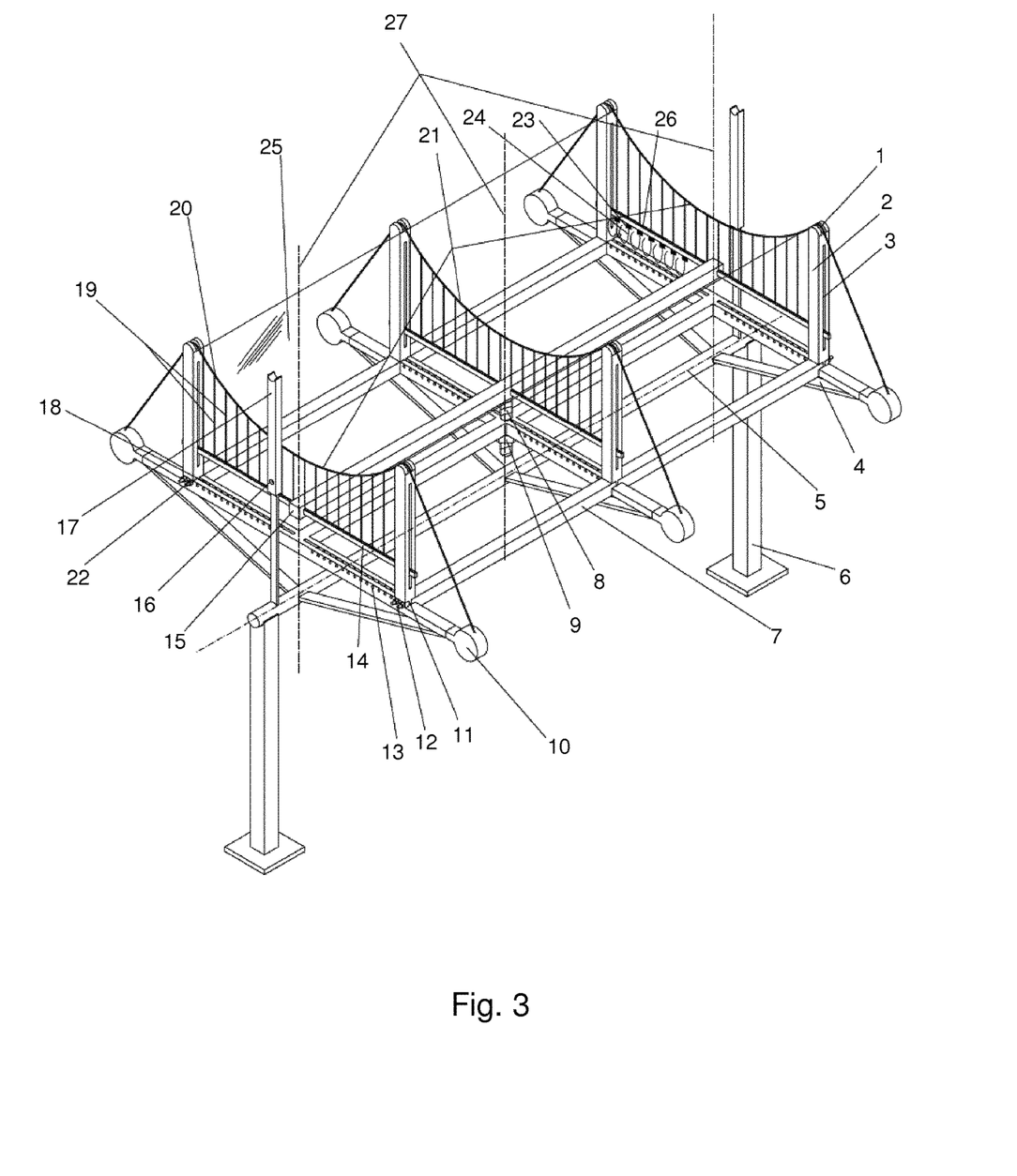
FIG. 3 shows an axonometric illustration of a parabolic trough collector with adjustable parameters.
Figure 4:
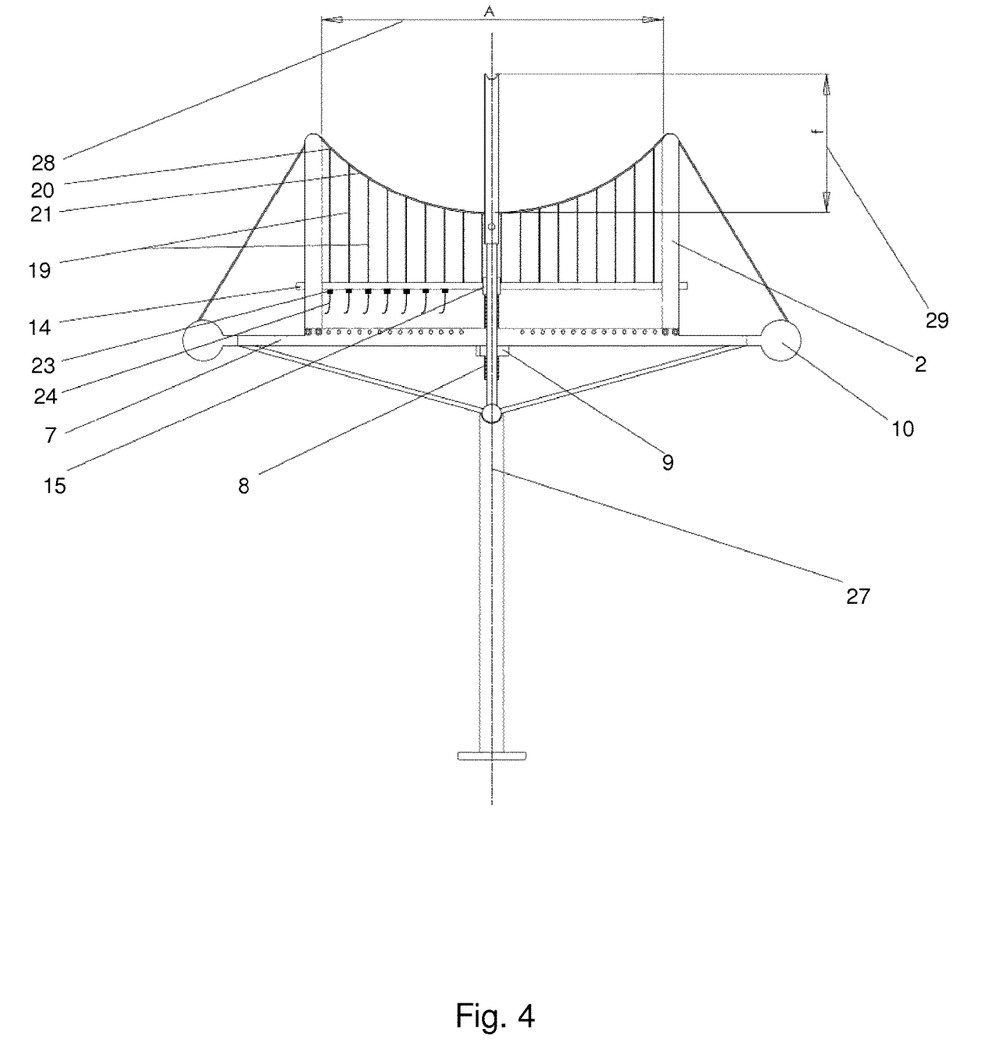
FIG. 4 shows a side view of the parabolic trough collector illustrated in FIG. 3.
Figure 5:
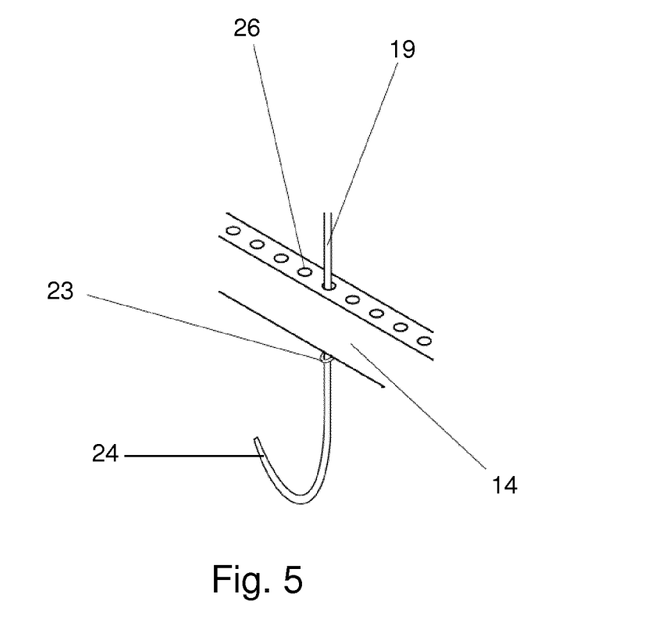
FIG. 5 shows an axonometric illustration of a connection, illustrated in FIGS. 3 and 4, between a traction means and a joist.
Figure 6:
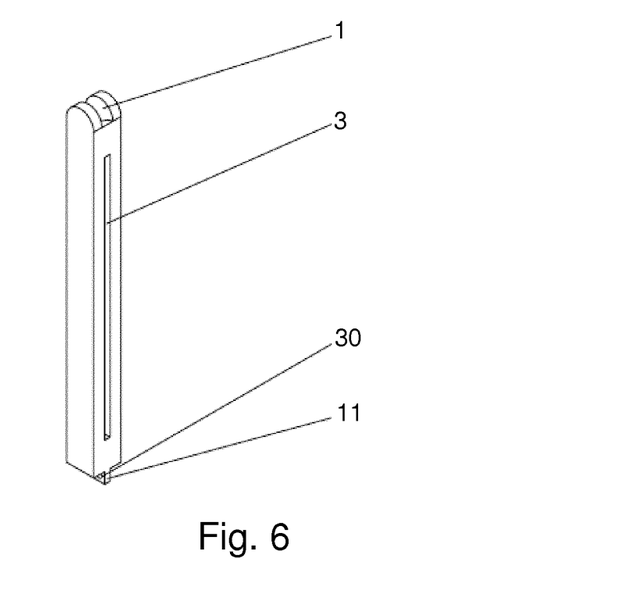
FIG. 6 shows an axonometric illustration of a pylon of the parabolic trough collector illustrated in FIG. 3 and FIG. 4.

FIGS. 3 through 6 show another exemplary embodiment of the invention that is illustrated in detail. FIG. 4 shows a side view of the parabolic trough collector illustrated in FIG. 3. FIG. 5 shows an axonometric illustration of a connection, illustrated in FIG. 3 and FIG. 4, between a traction means and a joist. FIG. 6 shows an axonometric illustration of a pylon of the parabolic trough collector illustrated in FIG. 3 and FIG. 4.

The ropes 21 are fitted in curved saddles 1 between pylons 2 and form parabolas which have centrally extending symmetry axes 27.

The parabolic shape of the ropes is effected by applying a force that acts parallel to the symmetry axes of the parabolas 27 and is uniformly distributed along the direction perpendicular to the symmetry axes 27.

This force is exerted by traction means 19 which connect the ropes 21 to the joists 14. The traction means 19 are aligned parallel to the symmetry axes of the parabolas 27 and the distances between them are identical. All joists 14 are connected to a longitudinal strut 15 that extends perpendicular to the symmetry axes of the parabolas 27.

The longitudinal strut 15 is pulled to a fixed lower part 7 by a threaded rod 8, which is welded to the floating longitudinal strut 15 in the middle thereof, and a clamping nut 9 with a force that is higher than the weight force of the ropes 21 and the reflective material and all other acting forces such as, e.g., the wind loads. Thus, the weights of the ropes 21 and the reflective material 25 and all other acting forces are negligibly low.

The connection between the traction means 19 and the ropes 21 is established by wire rope clamps 20.

The traction means 19 are threaded in the vertical holes 26 of the joists 14 in a symmetrical manner about the symmetry axes of the parabolas 27 so that the distances between the traction means are identical.

Wire rope clamps 23, which are more clearly shown in FIG. 4, are clamped onto the lower parts 24 of the traction means 19, which lower parts are located below the joists 14. The distances between each rope 21 and the wire rope clamps 23 clamped onto the traction means form a parabola. Thus, the exerted tensile forces are almost equal in all individual traction means 19, and the ropes 21 are brought into a parabolic shape.

For clarity reason, not all freely suspended parts of the traction means, which are located below the joists 14, and the wire rope clamps 23 clamped thereon are shown in FIG. 3 and FIG. 4 (they are shown only for seven traction means 19). In FIG. 3, six pylons 2, two pylons 2 for each rope 21, are illustrated. On their tips, these pylons 2 have curved saddles 1 in which the ropes 21 are fitted. These saddles 1 have the task to convert almost all forces (including the wind loads) acting on the parabolic trough collector into compressive forces acting onto the pylons 2; thus, material costs for the pylons 2 and the static substructure can be saved.

Each pylon 2 has a continuous opening 3 that has two functions. Firstly, to permit the movement of the floating longitudinal strut 15 with the joists 14, which movement is parallel to the symmetry axes of the parabolas 27, when unscrewing or tightening the clamping nut 9. Secondly, when adjusting the aperture 28 of the parabolic trough collector, the pylons 2 are displaced perpendicular to the symmetry axes of the parabolas 27, which is made possible by the continuous opening 3 in any height of the joists 14.

In accordance with a first exemplary embodiment of the method in accordance with the invention, the aperture 28 and the focal length 29 of the parabolic trough collector are adjustable, wherein it has to be taken into account that prior to adjusting the aperture 28 or the focal length 29:

a. the parabolic trough collector is brought into the horizontal position so that the pylons 2 are vertical, b. then, the detachable connections between the ropes 21 and the narrow (flat) mirror segments or the bendable reflective material 25 are disconnected, c. then, the mirror segments or the bendable reflective material 25 are/is removed, d. then, the clamping nut 9 is unscrewed in order to relieve the tensile forces of the traction means 19 and the ropes 21, e. then, the wire rope clamps 20, which connect the traction means 19 to the ropes 21, are disassembled, f. then, the wire rope clamps 23, which are clamped onto the parts of the tractions means 24 located below the joists 14, are disassembled, and g. then, the traction means 19 are removed.

The aperture 28 can be adjusted as desired by:

a. unscrewing the nuts 22, which are screwed tightly on the thread ends of the long rods 12, and pulling out the rods 12, b. subsequently displacing the pylons 2 on the lower part 7 horizontally and symmetrically about the symmetry axes of the parabolas 27. In order to enable this displacement in any desired height of the joists, each pylon 2 has a continuous opening 3. All pylons 2 on one of the two sides of the ropes 21 have to be displaced by the same distance and in the same direction. All pylons 2 on one of the two the sides of the ropes 21 have to be displaced by the same distance and in the same direction, c. subsequently, when the required aperture 28 is achieved, inserting long rods 12 into the holes 13 in the lower part 7 and into the two holes 30 in the tongues 11 of the pylons 2, which are shown in FIG. 4. Thus, the pylons 2 have no clearance because their tongues 11 fit perfectly in grooves 18 in the lower part 7, and d. subsequently fastening the rods 12 by tightly screwing the nuts 22 onto the thread ends of said rods.

The focal length 29 can be adjusted as desired by:

a. pulling in the ropes 21 by means of the rollers 10, which are located on both sides of the ropes 21 and which are similar to fishing reels with respect to structure and function, if the focal length 29 is to be increased, or by elongating them if the focal length 29 is to be reduced. It has to be ensured that all lengths of the ropes 21 are equal after the adjustment, and b. subsequently, upon reaching the length that results in the desired focal length 29, fitting the ropes 21 in the saddles 1 and setting these length by the rollers 10 that are fastened on the lower part 7.

After the adjustment of the aperture 28 or the focal length 29, the ropes 21 are brought again into a parabolic shape, and the reflective material 25 is secured on the ropes 21 by:

a. threading the traction means 19 into the vertical holes 26 of the joists 14 and symmetrically about the symmetry axes of the parabolas 27 so that the distances between the traction means are equal, b. subsequently connecting the upper ends of the traction means 19 to ropes 21 by means of wire rope clamps 20 so that all traction means 19 are vertical. These connections have to be strong enough in order to prevent the traction means 19 from sliding off the ropes 21, c. subsequently clamping wire rope clamps 23 onto those portions of the traction means 24 that are below the joists 14 so that the distances between each rope 21 and the wire rope clamps 23 clamped onto the traction means 19 form a parabola, d. measuring the distances where the two traction means 19 are connected on the far left and the far right to the rope 21 and the distance in the middle of the rope 21 between the rope 21 and the joists 14 in order to obtain the equation of the parabola, e. subsequently tightening the clamping nut 9 with a force that is greater than the weight of the rope 21 and the reflective material 25. Thus, the exerted tensile forces are almost equal in all individual traction means 19, and the ropes 21 are brought into a parabolic shape, f. subsequently fastening mirror elements or bendable reflective material 25 on the ropes 21 using detachable connections, and g. subsequently adjusting the height of the absorber tube or the photovoltaic module by means of the adjustable absorber holder 17 which consists of two profiled elements, one of which slides into the other one and has a hole 16 with an internal thread, in order to set the desired height by tightening a screw.

The length of the parabolic trough collector is controlled by arranging the required number of ropes 21 along the longitudinal axis 5. This parabolic trough collector can be equipped with a conventional tracking system about one or two motion axes. The positional angle does not matter for the parabolic shape of the ropes 21 as long as the traction means 19 pull the ropes 21 with a force greater than the weight of the ropes 21 and the reflective material 25 and all other acting forces such as, e.g., the wind loads. For tracking about a horizontal axis, the longitudinal axis 5 can be used as the horizontal axis of the tracking system, which is connected to the lower part 7 by supports 4. The entire parabolic trough collector can be attached on a conventional mounting system 6.

The invention is not limited to the illustrated exemplary embodiments, but covers all embodiments within the following patent claims.

REFERENCE LIST 1 saddle
2 pylon
3 opening
4 support
5 longitudinal axis
6 mounting system
7 lower part
8 threaded rod
9 clamping nut
10 roller
11 tongue
12 rod
13 hole
14 joist
15 longitudinal strut
16 hole
17 absorber holder
18 groove
19 traction means
20 wire rope clamp
21 rope
22 nut
23 wire rope clamp
24 lower parts of the traction means
25 reflector
26 hole
27 symmetry axis
28 aperture
29 focal length
30 hole
31 engagement point
32 support arm
33 deflection rollers
34 clamps

What is claimed is:

1. A device for holding a parabolic reflector or a parabolic trough collector, comprising:
a lower part having at least two engagement points provided at distal ends thereof;
at least one elongated, flexible tensioning element attached for suspension at the engagement points to carry the parabolic reflector or the parabolic trough collector;
at least one joist spaced from and moveable relative to the at least one elongated, flexible tensioning element; and
traction means attached to the at least one elongated, flexible tensioning element or are part of the at least one elongated, flexible tensioning element, the traction means being configured to simultaneously receive a tensile force, by action of downward movement of the at least one joist, in a direction towards the lower part in such a manner that the at least one elongated, flexible tensioning element, and thus, the parabolic reflector or the parabolic trough collector, is to thereby adopt and maintain a parabolic shape.

2. A device for forming and holding a parabolic reflector or a parabolic trough collector, comprising:
a lower part having at least two engagement points provided at distal ends thereof;
at least one elongated, flexible tensioning element attached for suspension at the engagement points to connectedly carry a reflective material to form the parabolic reflector or the parabolic trough collector;
at least one joist spaced from and downwardly moveable relative to the at least one elongated, flexible tensioning element; and
traction means attached to the at least one elongated, flexible tensioning element or are part of the at least one elongated, flexible tensioning element, the traction means being configured to simultaneously receive a tensile force, by action of downward movement of the at least one joist, in a direction towards the lower part in such a manner that the at least one elongated, flexible tensioning element, and thus, the connected reflective material forming the parabolic reflector or the parabolic trough collector, is to thereby adopt and maintain a parabolic shape.

3. The device of claim 1, wherein the tensile forces on the traction means are different from each other.

4. The device of claim 1, wherein the lower part comprises at least two support arms having ends which form the engagement points.

5. The device of claim 1, wherein the lower part comprises pylons arranged having ends which form or comprise the engagement points.

6. The device of claim 1, wherein the at least one elongated, flexible tensioning element comprises a cable, a wire, a rope, or a chain, or a flexible sheet metal.

7. The device of claim 1, wherein the traction means and/or the at least one elongated, flexible tensioning element are adjustable with respect to their respective lengths.

8. The device of claim 1, wherein the traction means comprises a plurality of spaced apart rods, ropes, chains, cables, or elastic springs.

9. The device of claim 1, wherein the traction means is arranged to extend substantially vertically such that the tensile forces are acting thereon substantially vertically towards the lower device part.

10. The device of claim 1, wherein the traction means comprises rods, ropes, chains, cables, or elastic springs that are spaced apart such that the distance between neighboring ones thereof are substantially identical, and the tensile force acting on each is substantially identical.

11. The device of claim 1, wherein the at least one joist is guided with respect to the lower part in such a manner that during a movement of the at least one joist in the direction of the lower part, the tensile force is exerted on the traction means.

12. The device of claim 1, wherein the at least one joist comprises a plurality of joists which are connected via a connecting element, and which are configured to be set in motion jointly.

13. The device of claim 12, wherein:
the traction means comprises sections of an elongated bendable traction rope;
deflection rollers are to moveably mount each traction rope and are provided on the at least one elongated, flexible tensioning element and the joists; and
the traction rope is guided by the deflection rollers on the at least one elongated, flexible tensioning element and the joists.

14. The device of claim 1, wherein horizontal projections arranged between spaces of neighboring deflection rollers along the at least one elongated, flexible tensioning element are substantially identical.

15. The device of claim 1, further comprising a tracking system for tracking movement of the sun.

16. The device of claim 1, wherein the distance of the engagement points from one another and/or the length of the traction means between the engagement points is adjustable.

17. The device of claim 1, wherein the at least one elongated, flexible tensioning element comprises a circumferentially extending rope.

18. A device for forming and holding a parabolic reflector or a parabolic trough collector, comprising:
a lower part having at least two support arms having ends which form engagement points;
at least one elongated, flexible tensioning element attached for suspension at the engagement points to connectedly carry a reflective material to form the parabolic reflector or the parabolic trough collector;
at least one joist rigidly attached to the lower part and spaced from the at least one elongated, flexible tensioning element; and
traction means extending spaced apart between and attached to the at least one elongated, flexible tensioning element and the at least one joist, the traction means being configured to simultaneously receive a tensile force, by adjustment of the respective lengths of the traction means, in a direction towards the lower part in a manner such that the at least one elongated, flexible tensioning element, and thus, the connected reflective material forming the parabolic reflector or the parabolic trough collector, is to thereby adopt and maintain a parabolic shape.

19. A method for forming and holding a parabolic reflector or a parabolic trough collector, the method comprising:
attaching an elongated, flexible tensioning element which is to connectedly carry a reflective material to form the parabolic reflector or the parabolic trough collector, between at least two engagement points of a lower part;
attaching at least one joist rigidly to the at least one elongated, flexible tensioning element; and
simultaneously applying a tensile force to a traction means, either by action of downward movement of the at least one joist or by adjustment of length of the traction means, in a direction towards the lower part in a manner such that the at least one elongated, flexible tensioning element, and thus, the connected reflective material forming the parabolic reflector or the parabolic trough collector, is to thereby adopt and maintain a parabolic shape.

20. The method of claim 19, further comprising:
setting an aperture of the parabolic reflector or the parabolic trough collector by displacing the engagement points symmetrically with respect to the lower part in a horizontal direction; and
setting a focal length of the parabolic reflector or the parabolic trough collector by adjusting the length of the elongated, flexible tensioning element between the engagement points.

* * * * *